(12) United States Patent
Popovic

(10) Patent No.: US 6,292,519 B1
(45) Date of Patent: Sep. 18, 2001

(54) CORRECTION OF SIGNAL-TO-INTERFERENCE RATIO MEASUREMENTS

(75) Inventor: Branislav M. Popovic, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/038,067

(22) Filed: Mar. 11, 1998

(51) Int. Cl.$^7$ ........................................ H04L 1/00
(52) U.S. Cl. .................. 375/346; 375/130; 375/227; 455/63; 455/69
(58) Field of Search ..................... 375/346, 227, 375/130, 267; 455/69, 63, 442, 522; 370/335

(56) References Cited

U.S. PATENT DOCUMENTS

| | | | |
|---|---|---|---|
| 5,455,967 | * 10/1995 | Amezawa et al. | 455/69 |
| 5,604,766 | * 2/1997 | Dohi et al. | 375/130 |
| 5,623,484 | 4/1997 | Muszynski | 370/335 |
| 5,691,988 | 11/1997 | Yamada et al. | 714/704 |
| 5,878,350 | * 3/1999 | Nakamura et al. | 455/442 |
| 6,028,894 | * 2/2000 | Oishi et al. | 375/227 |
| 6,034,952 | * 3/2000 | Dohi et al. | 370/335 |

FOREIGN PATENT DOCUMENTS

| | | |
|---|---|---|
| 0 762 668 A | 3/1997 | (EP) . |
| 0 809 365 A | 11/1997 | (EP) . |
| 98/02981 A | 1/1998 | (EP) . |
| 0 833 472 A | 4/1998 | (EP) . |
| 0 853 393 A | 7/1998 | (EP) . |
| 94/05100 A | 3/1994 | (WO) . |

OTHER PUBLICATIONS

*Proc. Of VTC'95*, Chicago, Illinois, pp. 779–783, Jul. 1995, Koji Ohno, et al., "Wideband coherent DS–CDMA" *Coherent Spread Spectrum Systems*, J. Holms, Wiley, New York, NY, pp. 363–365, 1982.

* cited by examiner

Primary Examiner—Stephen Chin
Assistant Examiner—Shuwang Liu
(74) Attorney, Agent, or Firm—Nixon & Vanderhye P.C.

(57) ABSTRACT

Using measured estimates of received signal energy and interference values, a measured signal-to-interference ratio (SIR) value is determined. The measured SIR value is corrected for non-linearity to obtain a corrected SIR value using a correction function. That corrected SIR value may then be used in any number of applications such as to control the transmit power of mobiles in a mobile radio communications system.

27 Claims, 10 Drawing Sheets

CORRECTION OF SIGNAL-TO-INTERFERENCE RATIO MEASUREMENTS

The present invention relates to spread spectrum communications, and in particular, to accurate mobile transmit power control in a spread spectrum communications system.

A direct sequence spread spectrum system (DSSS) is a wideband system in which the entire frequency bandwidth of the system is available to each user all the time. A DSSS system employs a spreading signal that considerably expands or "spreads" the bandwidth of the transmitted information (baseband data) much more than the minimum bandwidth required to transmit the baseband data. The spreading of the data is performed using a spreading signal sometimes called a spreading sequence, or a spreading code, or a pseudo-noise (PN) code. Different users are distinguished by using different spreading codes. That is why DSSS systems are also referred to as Direct Sequence-Code Division Multiple Access (DS-CDMA) systems. The two terms are used interchangeably throughout the following description. The code signal is independent of the data and is of much higher rate (the chip rate) than the data signal (the bit or symbol rate).

At a CDMA receiver, the inverse operation of compressing or "de-spreading" the received signal bandwidth is performed in order to recover the original data signal and at the same time to suppress the interference from other users. De-spreading is accomplished by cross correlation of the received spread signal with a synchronized replica of the same code signal used to spread the data. Different users are provided with different PN codes or PN codes that are offset in time that allows their transmission to be separately decoded at a receiving station.

Spread spectrum systems have a number of advantages. For instance, contrary to other types of mobile radio access systems, CDMA base station receivers diversity combine separate multipaths, (e.g., a first line of sight path and a second path reflecting off a building), and achieve enhanced signal reception and performance. A RAKE receiver is used to handle multipath propagation. A RAKE receiver captures most of the received signal energy by allocating one of a number of parallel demodulators (referred to as "fingers") to each of the strongest components of the received multipath signal. The outputs of all the RAKE fingers are combined (taking the best from each finger) after a corresponding delay compensation to construct an optimum received signal.

Another advantage is CDMA systems tolerate interference—but only up to a certain threshold limit. The introduction of additional active mobile radio transmissions to the CDMA system increases the overall level of interference at the cell site receivers (base stations) receiving CDMA signals from the mobile radio transmitters. The particular level of interference introduced by each mobile's transmission depends on its received power level at the cell site, its timing synchronization relative to other sites at the cell site, and its specific cross-correlation with other transmitted CDMA signals.

Because of this multi-user interference limit, power control is very important in CDMA systems. Typically, power control attempts to achieve a constant mean power level for each mobile user received at a base station irrespective of how close or far each user is to the base station. This goal is readily understood by an analogy between a CDMA system and a party where a number of people are socializing in a room. As more and more people join the party, the room becomes more crowded, and the general noise level increases. As the noise level increases, it becomes more difficult for a listener to decipher a conversation. That difficulty is generally compensated for by the speaker (transmitter) speaking louder (higher transmit power). But speaking louder also exacerbates the existing noise level problem because it makes it even more difficult for others to hear so those others speak louder. Very soon the situation escalates to the point where no one at the party can comfortably or effectively communicate.

Accordingly, an important task of CDMA base stations is to control mobile transmit power of each mobile user, and they typically do so using a fast Transmit Power Control (TPC) algorithm. One efficient algorithm for the fast power control in DS-CDMA systems is based on Signal-to-Interference Ratio (SIR) measurements of mobile transmission received at the base station. The SIR is defined as the ratio of the data bit energy ($E_b$) to the interference (including noise) power spectral density ($I_o$). If the interference is assumed to be white noise, the power spectral density is equivalent to the interference power.

Two kinds of SIR measurements may be made in a base station. The first is a short term SIR measurement used for the generation of an uplink TPC message transmitted to the mobile. The short term SIR measurement value is compared with a reference $E_b/I_o$ value, and depending on the result, the mobile is ordered to increase or decrease its transmit power by some predetermined amount, (e.g., 1 dB). The second kind of SIR measurement is a long term SIR measurement used to adjust the reference $E_b/I_o$ level in order to achieve a specified frame error rate at the base station. Because the average power level received from the mobile varies depending on the terrain features, such as buildings and hills, the average mobile power is adjusted to achieve the specified bit error rate or frame error rate at the base station.

SIR measurement also finds application in mobile stations. For example, SIR measurement may be used for mobile-assisted soft-handover where the mobile measures SIR using the pilot signal transmitted from different base stations in order to establish one or more concurrent connections with the one or more base station(s) providing the best received signal quality. Another application of SIR measurements in a mobile station is Forward Loop Power Control where the base station adjusts the amount of power allocated to each mobile user so that the measured SIR at each mobile achieves a specified error rate.

In any case, the estimation of data bit energy $E_b$ is performed after de-spreading and RAKE combining in the receiver. Depending on the SIR measurement application, it may be performed using a short or a long averaging period. A short averaging period is used when the $E_b$ value is measured using only pilot preamble symbols transmitted at the beginning of each time slot within a data frame. For example, in third generation mobile systems, a typical signaling format may consist of 10 msec frames, each divided into 16 time slots of a 0.625 msec duration, where one time slot period corresponds to one power control period. Due to a relatively small number of pilot symbols, (e.g., 4), for practical spreading factors, (e.g., 16–256), the short term SIR measurements experience large fluctuations at low input SIR values, (e.g., less than 5 dB). Thus, for short term SIR measurements, the number of samples available for coherent $E_b$ estimation may be insufficient to eliminate the influence of noise and interference.

For long-term SIR measurements, it is possible to non-coherently average $E_b$ measurements over an entire frame. The $E_b$ values obtained for the pilot preamble and for each individual data symbol are averaged over the time slot period, and $E_b$ values obtained from all slots are averaged at the end of the frame to produce the final long term $E_b$ measurement value.

In both short and long term SIR measurement, the interference power $I_o$ may be averaged over a number of frames. More specifically, $I_o$ may be obtained by correlating the input signal multiple times with an uncorrelated (in the ideal case, orthogonal) PN code or with time-shifted versions of the original PN code used at the transmitter and averaging the multiple, squared, absolute correlation values over the number of frames.

An example of the relation between actual and estimated SIR in a DS-CDMA system is shown in FIG. 1 for a range of SIRs between −5 and 30 dB. The spreading factor (SF), equal to the number of PN chips used to spread a data symbol, is 64. Note that the chip energy, after transmit pulse/chip shaping, is normalized to one so the data symbol energy is equal to the spreading factor. From FIG. 1, it is seen that the relation between actual and estimated SIR is approximately linear for input values below about 10 dB; however, the SIR measurement values begin to saturate above about 10 dB.

Saturation of SIR values is particularly problematic, for example, immediately after random access procedures employed by mobile radios in order to acquire a traffic channel from the base station. During the random access procedure, each subsequent access attempt is transmitted at a power level that is for a specified amount higher than the previous one. After transmission of each access attempt, the mobile waits a specified period to receive an acknowledgment from the base station. If an acknowledgment is received, the access attempt ends, but the mobile keeps the same power level for subsequent transmission on the traffic channel. Therefore, when the base station begins to receive the traffic channel signal transmitted by the mobile, the transmitted mobile power can be very high and quite possibly saturate the SIR measurement at the base station. This may continue to be a problem as long as the transmitted mobile power is not reduced by a traffic channel power control loop. However, the power control loop requires more time and may even fail to reduce the mobile power if the measured SIR values are not correct.

One reason the SIR curve saturates is that out-of-phase, partial autocorrelation values of the PN code produce an additional source of interference (i.e., correlator self-noise) if the interference estimation is performed after correlation. Even if the interference is estimated by correlating the input signal with an uncorrelated PN sequence, the partial cross-correlation values are mainly not equal to zero because orthogonality can be achieved only for some short segments of long PN sequences. Therefore, even if the actual SIR of the received signal is infinite (in an ideal model), the measurement of that actual SIR is nevertheless limited by the ratio of the spreading factor to the average power of the out-of-phase partial autocorrelation of the spreading sequence.

Another cause of the measured SIR saturation is the fluctuation of the transmitted signal envelope due to the pulse/chip shaping filtration and/or non-ideal sampling synchronization in the receiver. The pulse shaping filter, used in the transmitter to limit the frequency bandwidth of the transmitted signal in order to satisfy the bounds of allocated transmit frequency band, usually has frequency characteristics that approximate a root raised-cosine. The impulse response of a finite impulse response (FIR) pulse shaping filter designed assuming four samples per chip period is shown in FIG. 2. The filter coefficients are normalized so that the impulse response energy is equal to 1. The filter spectral magnitude matches a root raised-cosine shape down to about −10 dB. The same filter is used in the receiver as a matched filter in order to maximize the signal-to-noise ration before de-spreading and demodulation. The matched filter output signal has the maximum value equal to the filter impulse response energy. If the matched filter output is sampled at the instants corresponding to the signal maximums, the resulting optimum signal will have the envelope equal to 1.

Assuming that quadrature phase shift keying (QPSK) spreading and de-spreading are performed in the CDMA transmitter and receiver, respectively, and that sampling instants in the receiver are shifted by one quarter of the chip period from the ideal sampling position, a de-spread signal envelope is produced as shown in FIG. 3. From FIG. 3, it is clear that the envelope fluctuations around the optimum value represent the interference for the demodulation process. This kind of "self-interference" exists even if there is no other interference on the communication channel, and may lead to the saturation of SIR measurements for high SIR values on the channel.

Saturation of SIR measurements at high SIR input values is a problem associated with processing DS-CDMA signals. Unfortunately, such SIR measurement saturation adversely affects the accuracy and effectiveness of power control procedures in DS-CDMA systems based on SIR measurements.

An object of the present invention is to perform accurate and effective mobile transmit power control in a CDMA communications system.

Another object of the present invention is to compensate for saturation of measured SIR values used in controlling mobile transmit power.

The present invention solves the above-identified problems and meets these objectives by correcting SIR measurements using a correction function. Using measured energy and interference estimates, a measured signal-to-interference ratio (SIR) value is determined. The measured SIR value is corrected for non-linearity to obtain a corrected SIR value. That corrected SIR value may then be used in any number of applications such as to control the transmit power of mobiles in a mobile radio communications system.

In a first example embodiment of the present invention, the correction function includes a linear part and a non-linear part. The non-linear part corresponds to an inverse of an exponential function that approximates a non-linear portion of a curve corresponding to measured SIR values. In a second example embodiment, the linear part of the correction function further includes first and second linear components to improve the accuracy of the correction function in certain situations. The parameters in the correction function in both of the first and second example embodiments are selected to minimize error between corrected SIR values and corresponding actual or ideal SIR values. In the context of a spread spectrum communications system, the parameters of the correction function are determined based on a spreading factor used to spread information to be transmitted over an available frequency spectrum.

BRIEF DESCRIPTION OF THE DRAWINGS

These and other objects, features, and advantages of the present invention will now be described in conjunction with the drawings in which.

DETAILED DESCRIPTION OF THE DRAWINGS

In the following description, for purposes of explanation and not limitation, specific details are set forth, such as particular embodiments, data flows, techniques, etc. in order to provide a thorough understanding of the present invention. However, it will be apparent to one skilled in the art that the present invention may be practiced in other embodiments that depart from these specific details. In other instances, detailed descriptions of well-known methods, interfaces, devices, and signaling techniques are omitted so as not to obscure the description of the present invention with unnecessary detail.

Figure 4:
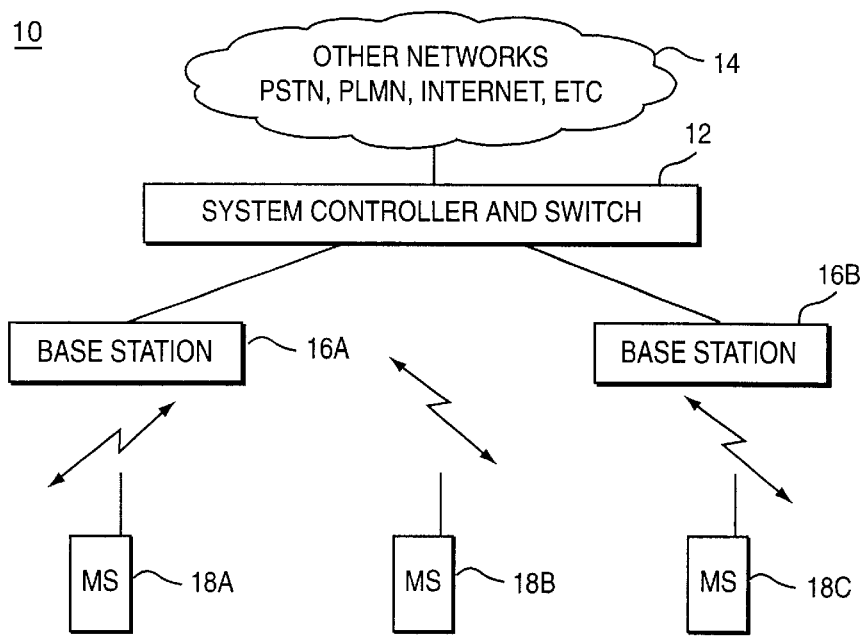
FIG. 4 is a function block diagram of a CDMA-based cellular radio communications system in which the present invention may be advantageously employed.

FIG. 4 illustrates an example CDMA cellular radio telephone system in which the present invention may be employed. In general, the CDMA system 10 utilizes spread spectrum modulation and demodulation techniques in communications between mobile stations (MS) 18a, 18b, and 18c and base stations 16a and 16b. Of course, cellular systems in large cities may have hundreds of base stations serving hundreds of thousands of mobile stations. The use of spread spectrum techniques, in particular CDMA, readily facilitates increases in user capacity in systems of this size as compared to conventional cellular systems that employ other access methodologies.

A system controller and switch 12 includes interface and processing circuitry for providing system control to the base stations 16a and 16b. In addition, system controller and switch 12 also control the routing of calls from various other networks including the Public Switched Telephone Network (PSTN), the Public Land Mobile radio Network (PLMN), the Internet, etc. shown as external network "cloud" 14 to the appropriate base station for transmission to the appropriate mobile station. The system controller and switch 12 also routes calls from the mobile stations via one or more of the base stations to one or more of these networks and connects calls between mobile stations via the appropriate base stations since mobile stations do not typically communicate directly with one another.

Each base station 16a and 16b services a corresponding geographical cell area. Each cell may also be divided into sectors, and each sector treated as a different coverage area. Accordingly, hand-offs may be made between sectors of the same cell as well as between multiple cells, and diversity may also be achieved between sectors as it is for cells.

The base station cells or sector areas are designed so that each mobile station is normally closest to one cell or sector area. When the mobile station is idle, it constantly monitors pilot signal transmissions from each nearby base station. As a result, the mobile station can determine which cell or sector provides the best service by comparing the signal strengths of the various received pilot signals. When a mobile station initiates a call, a control message is transmitted to the nearest base station, and the base station transfers the called number to the system and controller switch 12. The system controller then connects the call through one of the external networks to the intended recipient. Should a call be initiated within one of the external networks, the system controller 12 transmits the call information to all base stations in the area. Those base stations then in turn transmit a paging message within their respective coverage areas identifying the called mobile station. When the called mobile station "hears" the paged message, it responds with a control message to the nearest base station. This control message signals the system controller that this particular cell site is in communication with the mobile station. The system controller 12 routes the call through this base station to the mobile station. Should the mobile station move out of the coverage area of the initial base station coverage area, an attempt is made to continue the call by routing it through another base station.

Figure 5:
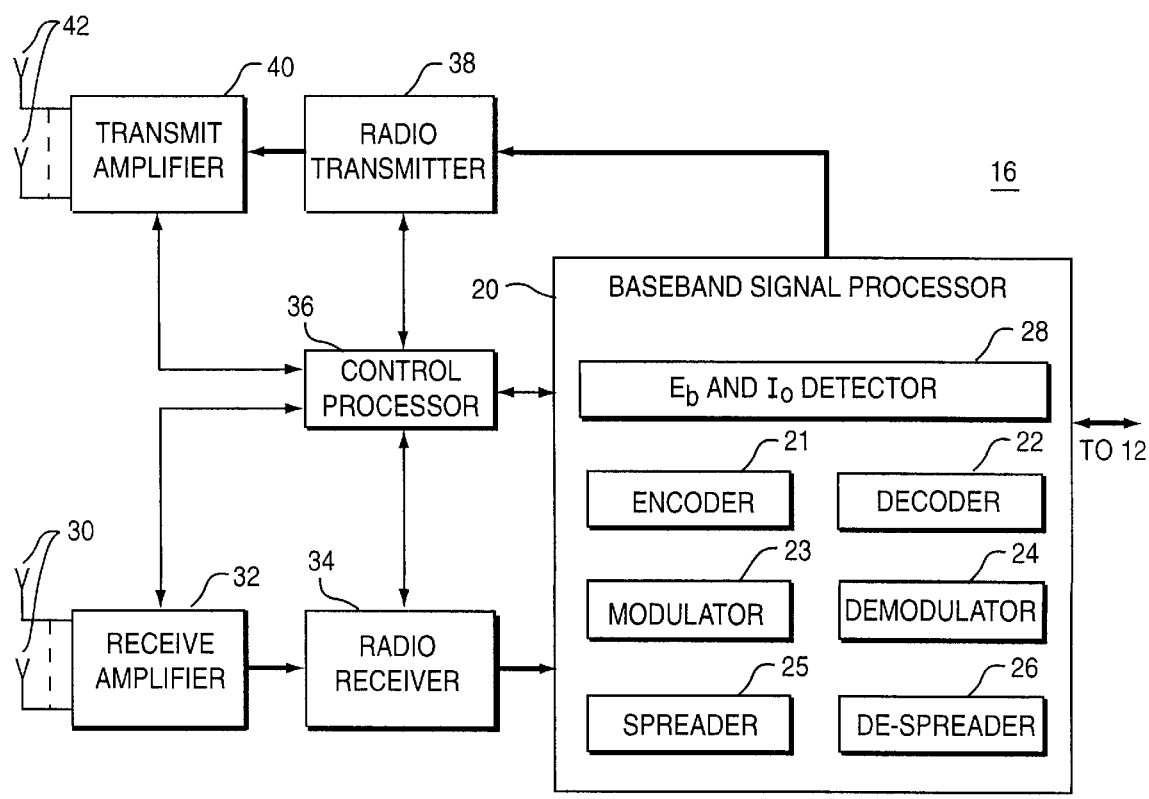
FIG. 5 is a function block diagram of a base station used in the CDMA communications system shown in FIG. 4.

FIG. 5 illustrates in block diagram form an example base station 16. An information signal coming from or going to the system controller 12 is processed in a baseband signal processor 20 which includes, among other things, an encoder 21, a decoder 22, a baseband modulator 23, a baseband demodulator 24, a spreader 25, and a de-spreader 26. All of these function blocks 21–26 are preferably (though not necessarily) implemented using appropriate digital signal processing circuitry. For signals to be transmitted from the base station 16, the baseband signal processor 20 performs error correction coding, framing, data modulation, and spreading using an appropriate PN code—all of which are known in the art. The processed signal output from the baseband signal processor is further processed in a radio transmitter block 38 which generates an RF signal amplified in a transmit amplifier block 40 that is ultimately transmitted via antennas 42.

Signals received at antennas 30 are amplified in receiver amplifier 32 and downconverted to the baseband in radio receiver block 34. The baseband signal processor 20 performs a number of signal processing functions including de-spreading of the received signal, chip synchronization, demodulation, error correction decoding, data demultiplexing, diversity combining, and other functions known in the art. A control processor 36 coordinates and controls the received amplifier block 32, the radio receiver block 34, the baseband signal processor block 20, the radio transmitter block 38, and the transmit amplifier block 40. The baseband signal processor 20 also includes a signal ($E_b$) and interference ($I_o$) detector 28 which measures currently received signal and interference values from the decoded signals (as described in the background section above), and then provides measured SIR values, expressed in decibel (dB) units, according to the following formula:

$$SIR = 10\log_{10}\left(\frac{E_b}{I_0}\right)[dB] \quad (1)$$

to the control processor 36. The control processor 36 corrects those SIR values in accordance with the present invention, as described in further detail below, and uses them to generate power control commands. Power control commands are transmitted from the base station to mobile stations communicating with the base station to regulate the transmit power level of those communicating mobile stations.

Figure 1:
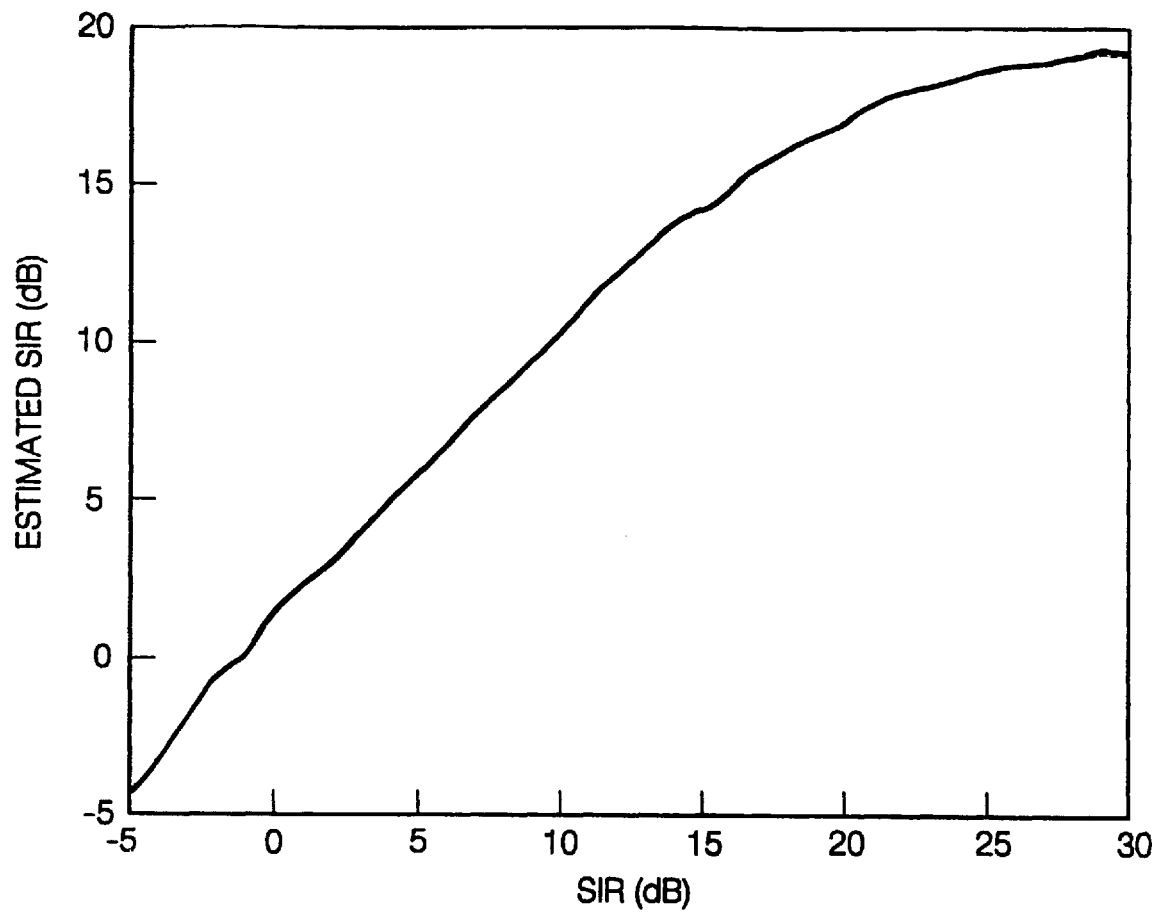
FIG. 1 is a graph showing a relationship between actual SIR and estimated SIR in a DS-CDMA system.
Figure 2:
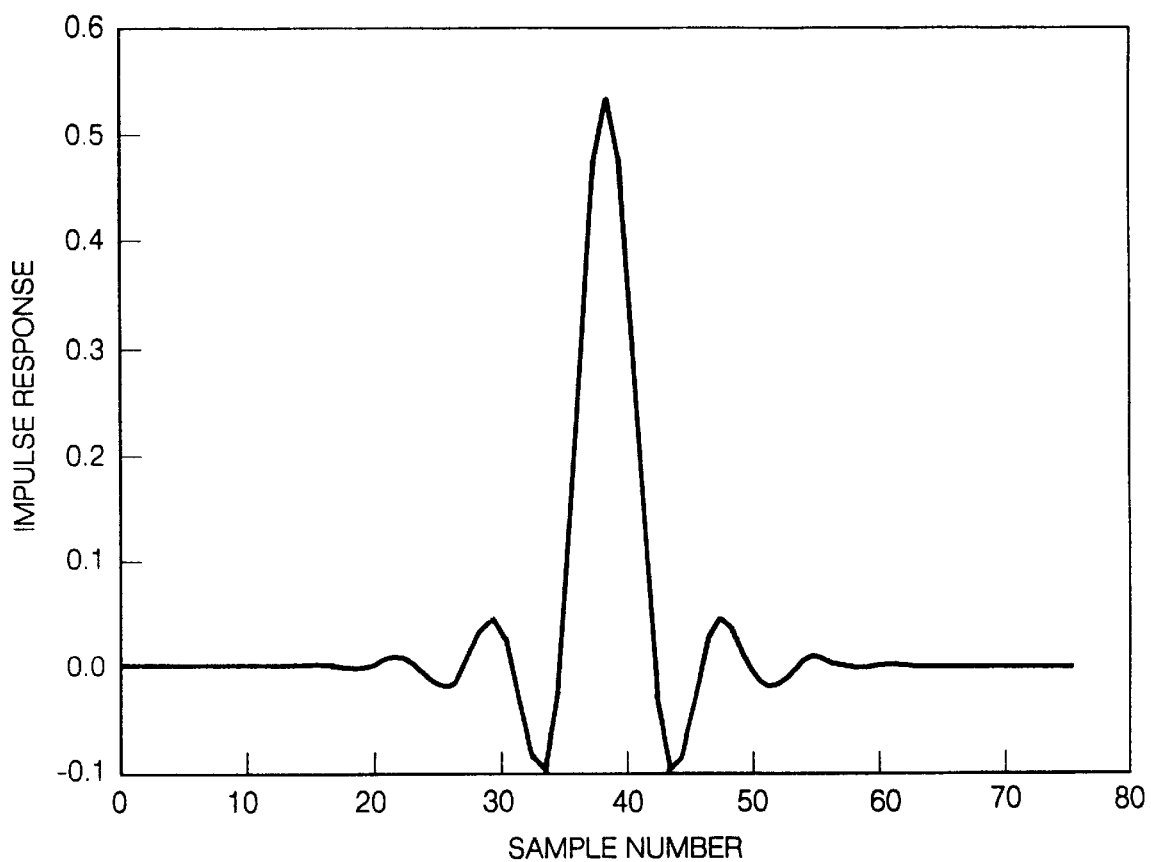
FIG. 2 is an impulse response of a finite impulse response pulse shaping filter that may be employed in a CDMA communications system.
Figure 3:
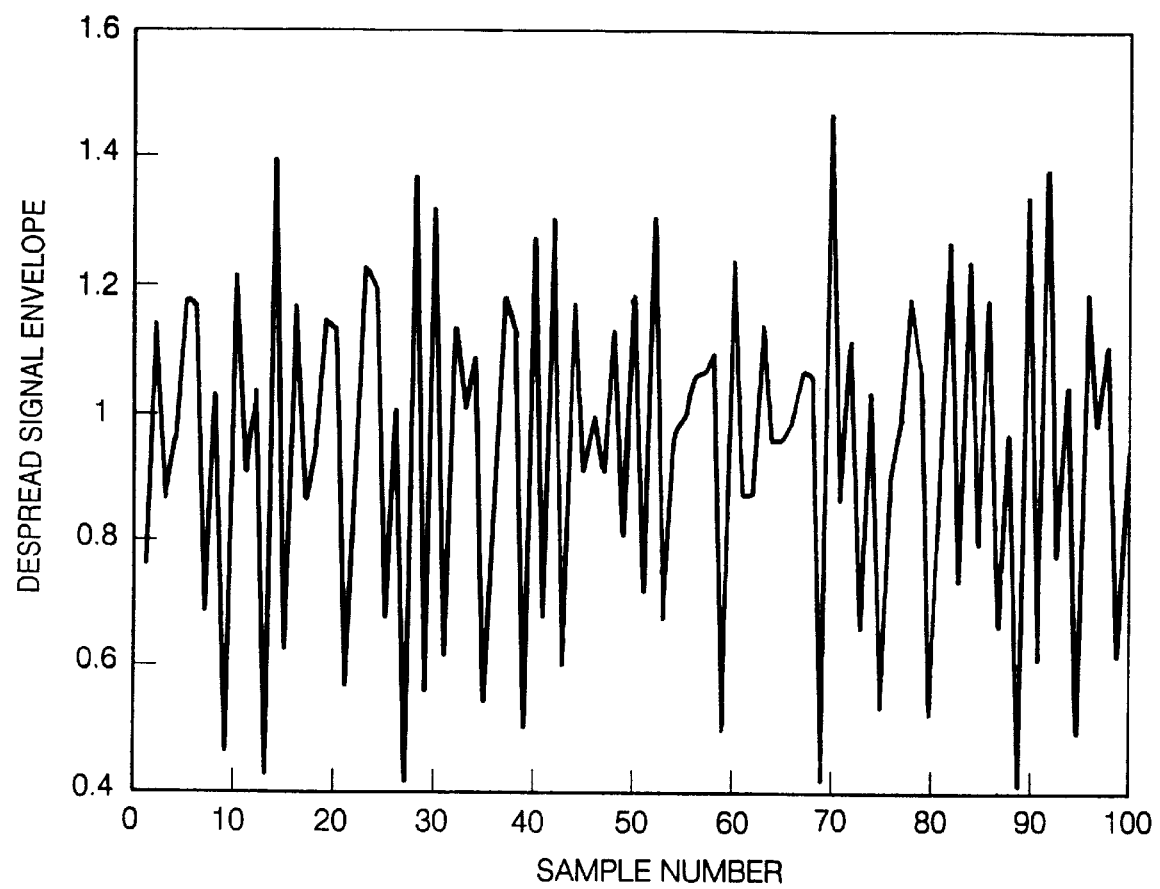
FIG. 3 is a graph illustrating an actual de-spread signal envelope in a CDMA communications system.

As described in the background section, and illustrated in FIG. 1, a problem with measured SIR values in CDMA systems is that they saturate and deviate in a non-linear fashion from the actual SIR values above a certain signal level. In order to compensate for the non-linearities of the measured SIR values, the control processor 36 applies a correction function to the measured SIR values received from the baseband signal processor 20. The non-linearity of measured SIR (in decibels) is very well approximated using an exponential function of the form:

$$x(t) = -C_o + C_1(1 - e^{-C_2 t}), \, C_0, \, C_1, \, C_2 > 0, \, t > T > 0. \quad (2)$$

With this approximation, the non-linear part of the SIR measurement curve is corrected by applying the inverse function (*) of the exponential function defined in equation (2), i.e., $$\frac{-\log_e\left[1 - \frac{(x + C_0)}{C_1}\right]}{C_2}. \quad (2)^*$$

Using that inverse function, a measured SIR correction function $y_1(x)$ in accordance with a first example embodiment of the present invention is given by $$y_1(x) = \begin{cases} K \cdot x - D, & x \leq T \quad \text{(linear part)} \\ \dfrac{-\log_e\left[1 - \dfrac{(x + C_0)}{C_1}\right]}{C_2}, & x > T \quad \text{(non-linear part)} \end{cases} \quad (3)$$

where x is the measured SIR value in decibels, T is an empirically determined SIR threshold at which measured SIR begins to saturate, and K, D, and $C_0$–$C_2$ are parameters whose values are determined in a manner described below. The correction function $y_1(x)$ includes a linear correction part and a non-linear correction part. The non-linear part of equation (3) corresponding to the inverse function in equation (2)* is relatively easy to calculate especially since there are only three coefficients $C_0$–$C_2$ to adjust. Therefore, the correction function may be calculated in real time based on currently received SIR values. Alternatively, the correction function can be used to generate a look-up table stored in memory for a desired range of measured SIR values.

Figure 6:
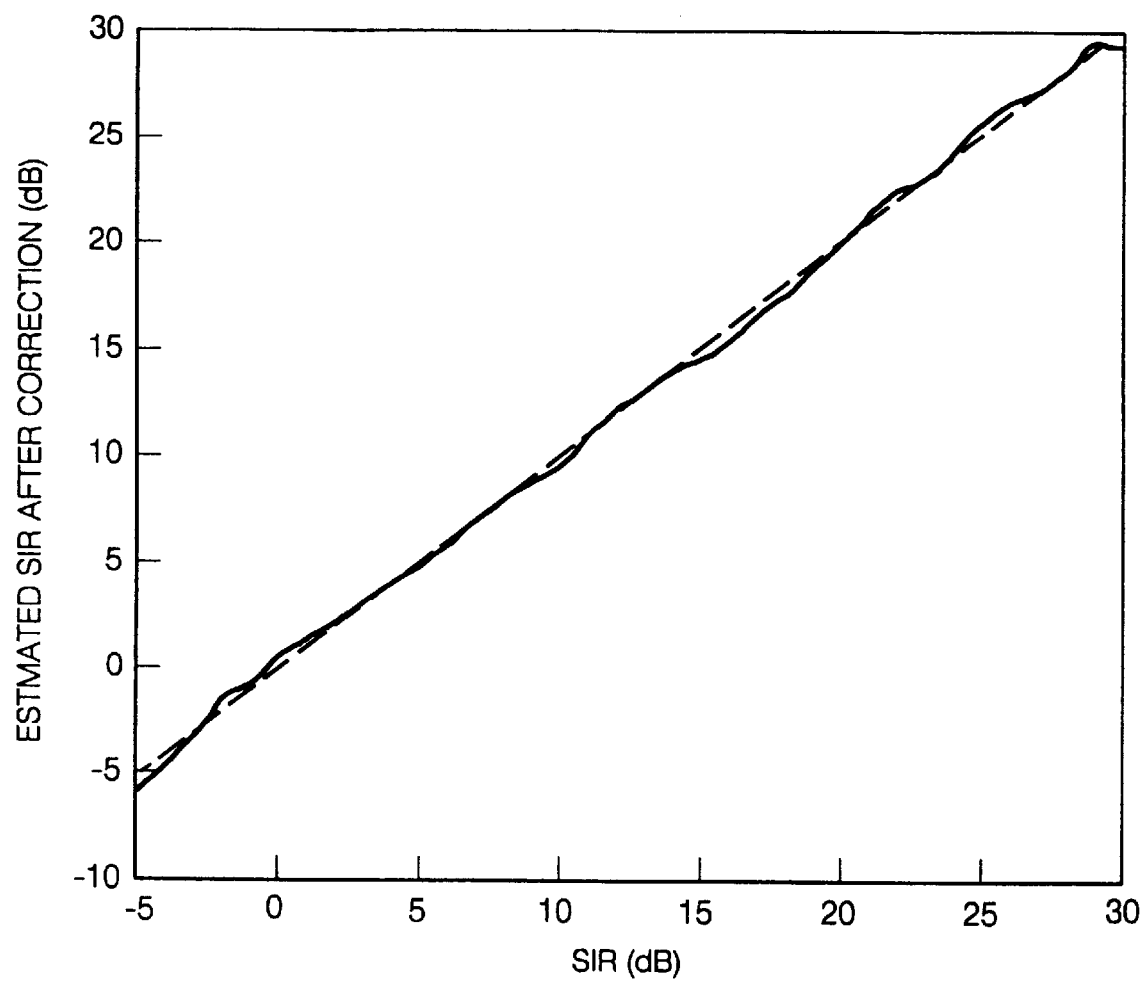
FIG. 6 is a graph illustrating an SIR curve corrected in accordance with the present invention and the corresponding ideal SIR curve.

Applying equation (3) to the measured SIR curve illustrated in FIG. 1 results in the corrected SIR curve shown in FIG. 6. As is evident from FIG. 6, the corrected SIR measurement curve is substantially linear over the entire measured SIR value range of −5 to 30 dB thereby compensating for the saturation effects experienced over the threshold SIR value T (i.e., 10 dB in this example).

Figure 7A:
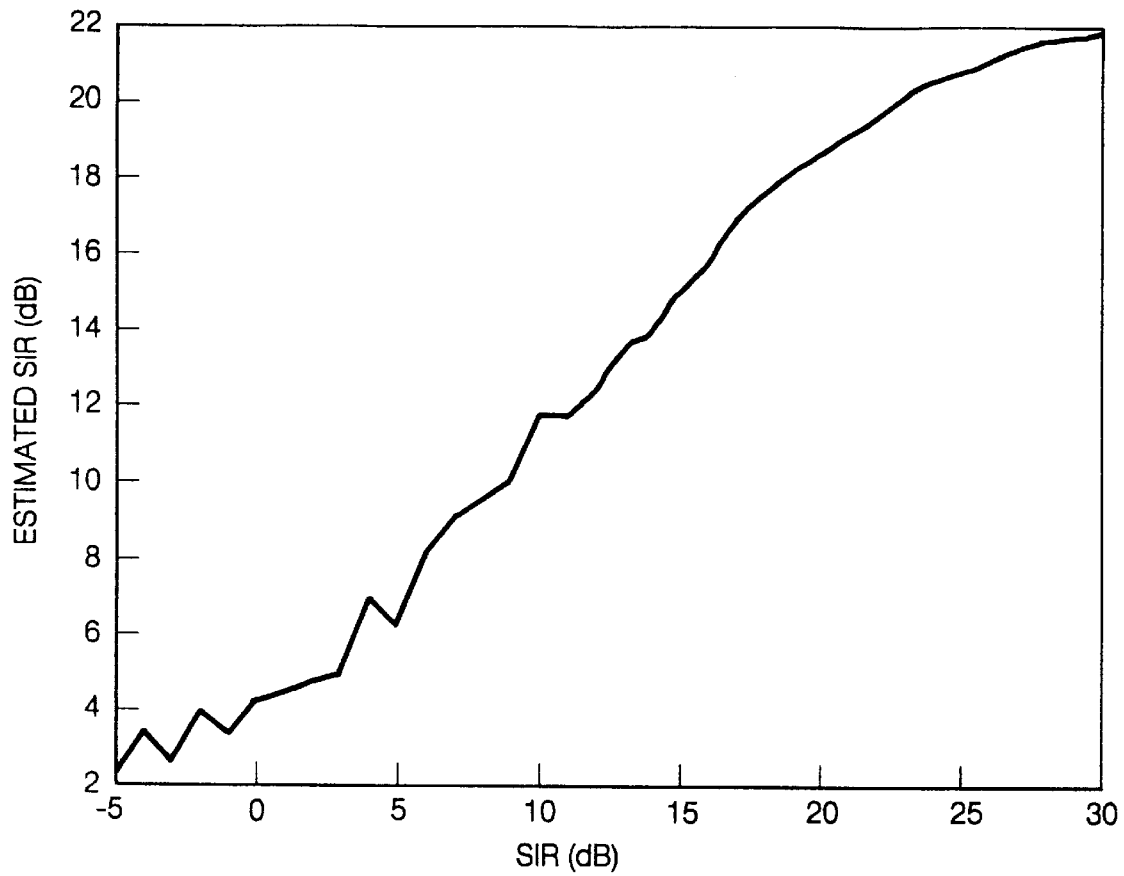
FIG. 7A is a graph illustrating estimated or measured SIR without correction for a spreading factor of 128.

At lower SIR values, there is an increased variance of measured SIR values due to the noise influence on the signal ($E_b$) measurement. To account for this increased variance, a second example embodiment of the present invention non-coherently averages detected signal ($E_b$) values obtained from both the pilot preamble and from each data symbol received during the TPC period. An estimated or measured SIR curve that illustrates a situation where the second example embodiment may be advantageously employed without correction is shown in FIG. 7A for a spreading factor (SF)=128. Corrected SIR values are obtained from the measured SIR values by applying a correction function $y_2(x)$ in accordance with the second example embodiment given by $$y_2(x) = \begin{cases} K_0 \cdot x - D_0, & x \leq T_0 \quad \text{(linear 1)} \\ K_1 \cdot x - D_1, & T_0 < x \leq T_1 \quad \text{(linear 2)} \\ \dfrac{-\log_e\left[1 - \dfrac{(x + C_0)}{C_1}\right]}{C_2}, & x > T_1 \quad \text{(non-linear 3)} \end{cases} \quad (4)$$

where x is the measured SIR value; $T_0$ and $T_1$ are thresholds determined by the noise influence at lower SIR levels; and $K_0$, $K_1$, $D_0$, $D_1$, $C_0$, $C_1$, and $C_2$ are parameters determined as described below.

The threshold value(s) T (in the first embodiment) or $T_0$, $T_1$ (in the second embodiment) as well as parameters K, D (in the first embodiment) or $K_0$, $K_1$, $D_0$, $D_1$, (in the second embodiment) and $C_0$–$C_2$ depend upon the measured SIR curve. The shape of measured SIR curve is a function of the spreading factor and the number of values used for non-coherent averaging. Each parameter value is determined such that it minimizes the maximum absolute error between the ideal and corrected SIR curves. The determination of these values can be done using manual tests and observation or using available numerical optimization algorithms.

Changing the spreading factor is equivalent to changing the number of samples for coherent averaging within the pilot preamble or each data symbol. Varying the spreading factor changes the shape of the measured SIR curve, and consequently, the parameters of the correction function change as well. The measured SIR saturation level (in dB) can be estimated as a function of spreading factor (SF) according to the following formula:

$$SIR_{sat}(SF) = 10\log_{10}\left(\frac{SF}{L_{si}}\right), \quad (5)$$

where $L_{si}$ is the average self-interference power after de-spreading and RAKE combining. For example, by taking $L_{si}=0.8$, saturation levels equal to 13 dB, 19 dB, and 22 dB are obtained from the above formula for the spreading factors equal to 16, 64, and 128, respectively. These saturation values match the measured values shown in FIGS. 8a, 1, and 7a, respectively. The range of linearity of measured SIR curves thus increases proportionally to the spreading factor.

The following table includes example values of the various coefficients in equation (3) determined for two different spreading factor values 128 and 16. The threshold values were experimentally determined to be $T_0=5$ and $T_1=11$.

| Spread Factor | $D_0$ | $K_0$ | $D_1$ | $K_1$ | $C_0$ | $C_1$ | $C_2$ | Maximum Abs. Error [dB] between corrected and ideal SIR Values |
|---|---|---|---|---|---|---|---|---|
| 128 | 11.7 | 2.7 | 2.2 | 1.09 | 14.11 | 38 | 0.10 | 1.65 |
| 16 | 8.71 | 2.08 | 4.51 | 1.49 | 23.41 | 36.95 | 0.21 | 2.38 |

Figure 7B:
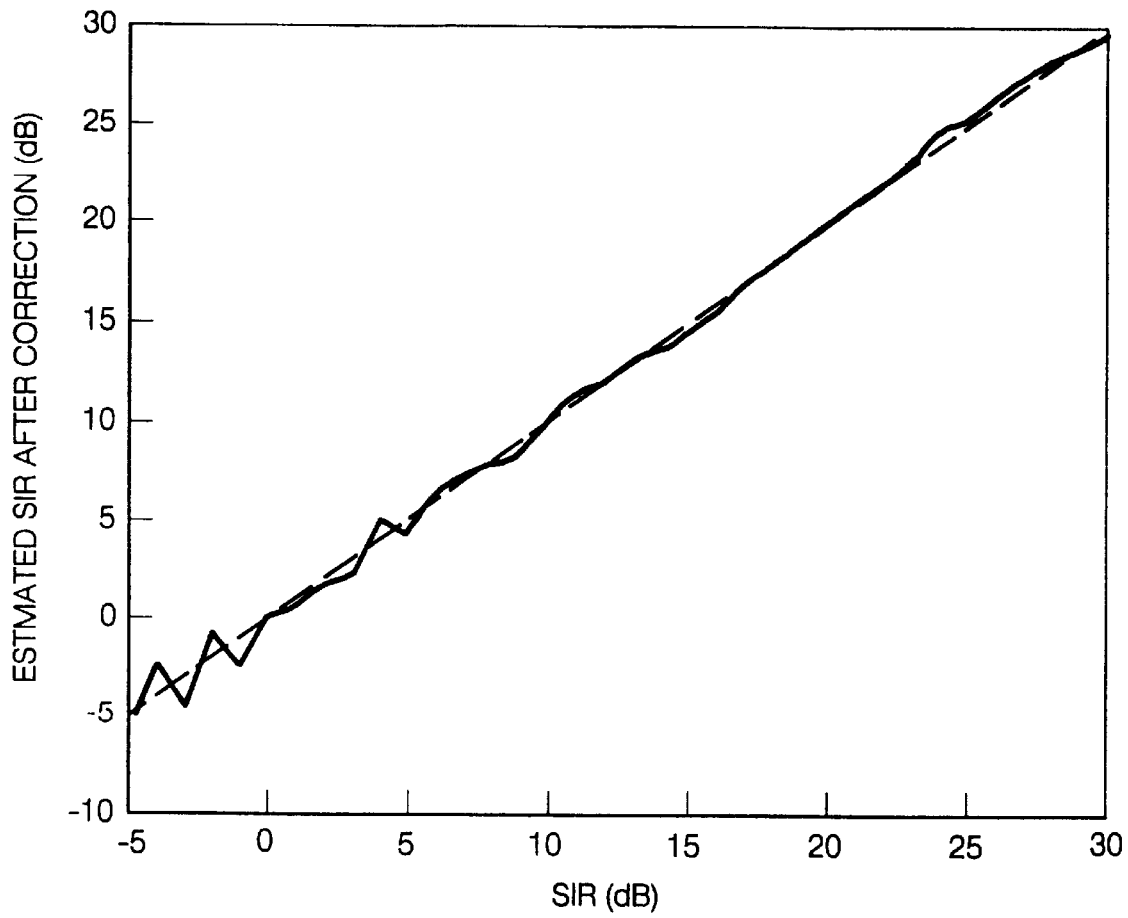
FIG. 7B is a curve illustrating the measured SIR values with correction.
Figure 8A:
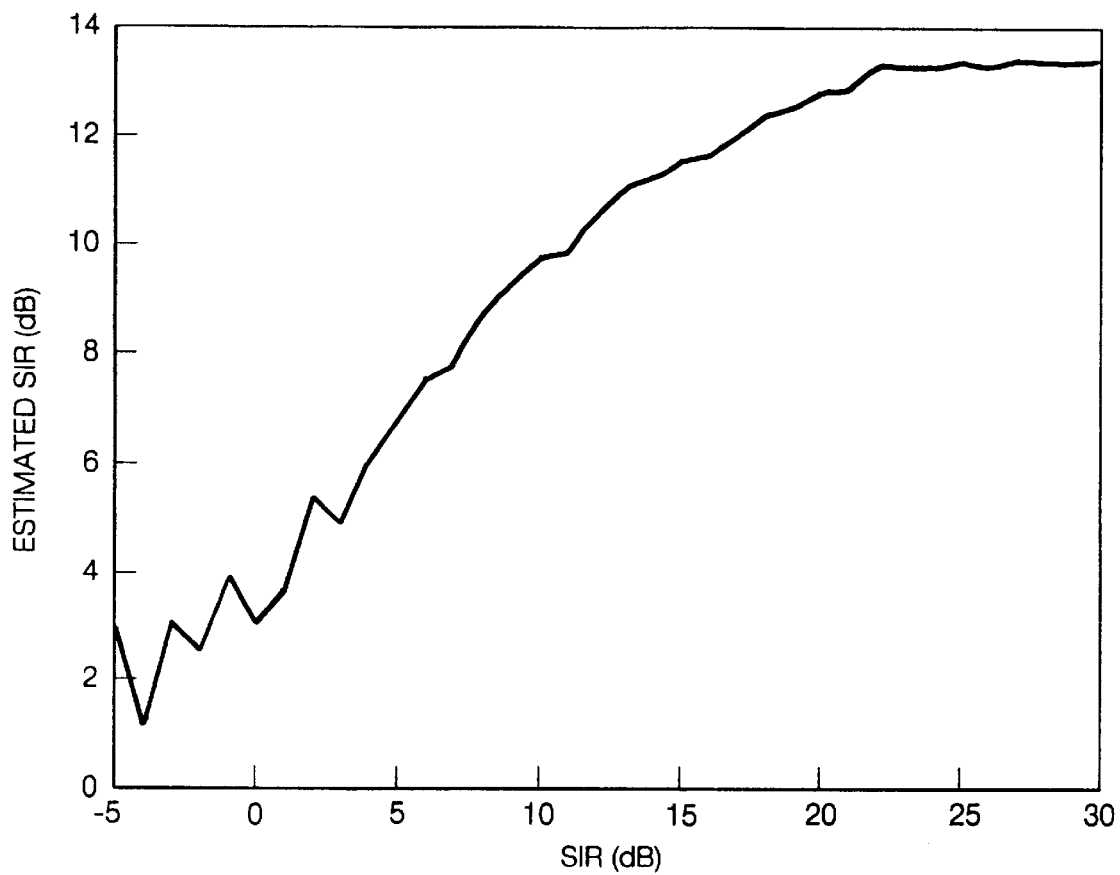
FIGS. 8A and 8B show corresponding measured and corrected SIR curves when the spreading factor is reduced from 128 to 16.
Figure 8B:
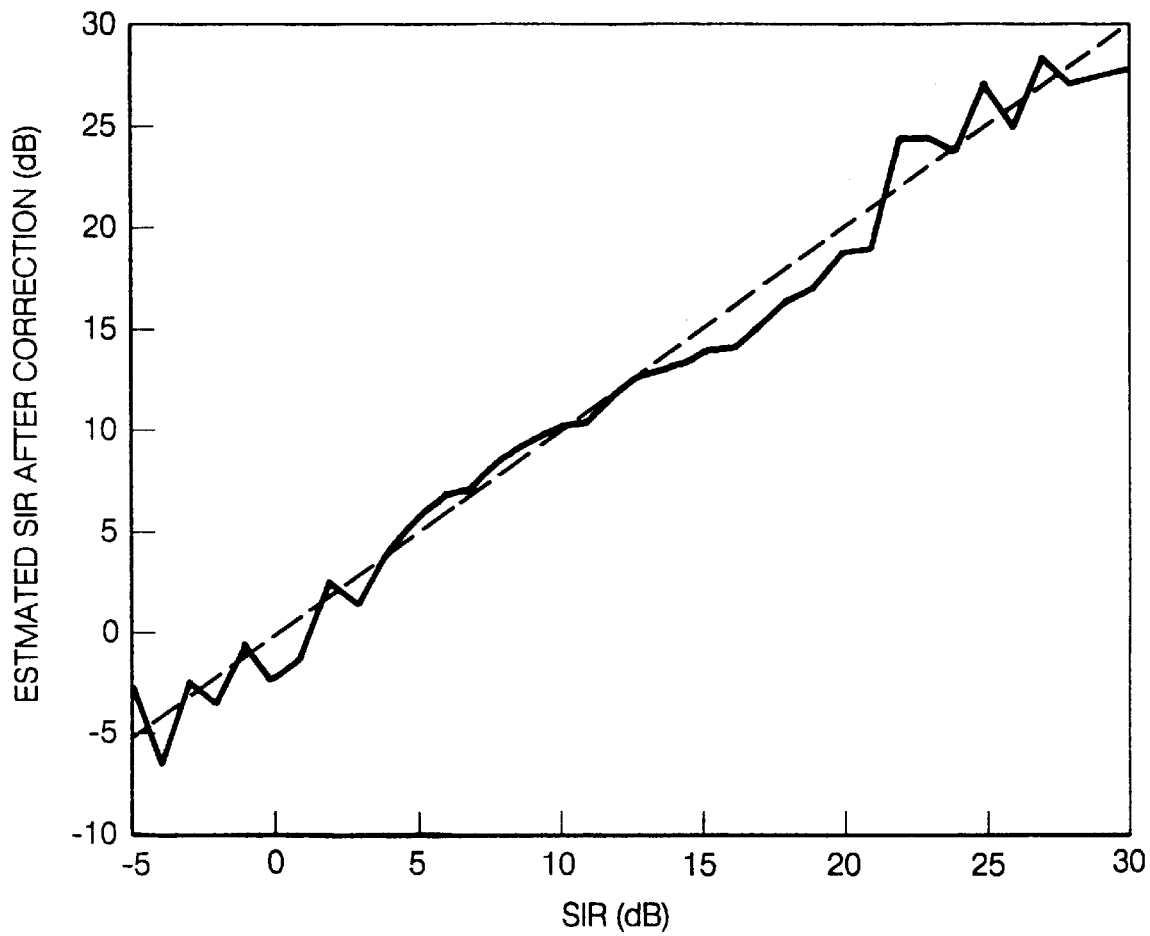

The corrected SIR measurement curve, obtained by applying Equation (3) to the measured curve shown in FIG. 7A and using the values in the above table, is shown in FIG. 7B. Note that the curve in FIG. 7B is essentially linear all the way through the SIR range of −5 to 30 dB. As another example, FIGS. 8A and 8B show the measured and corrected SIR curves, respectively, when the spreading factor is reduced from 128 to 16. The corrected SIR curve in FIG. 8B is essentially linear.

Figure 9:
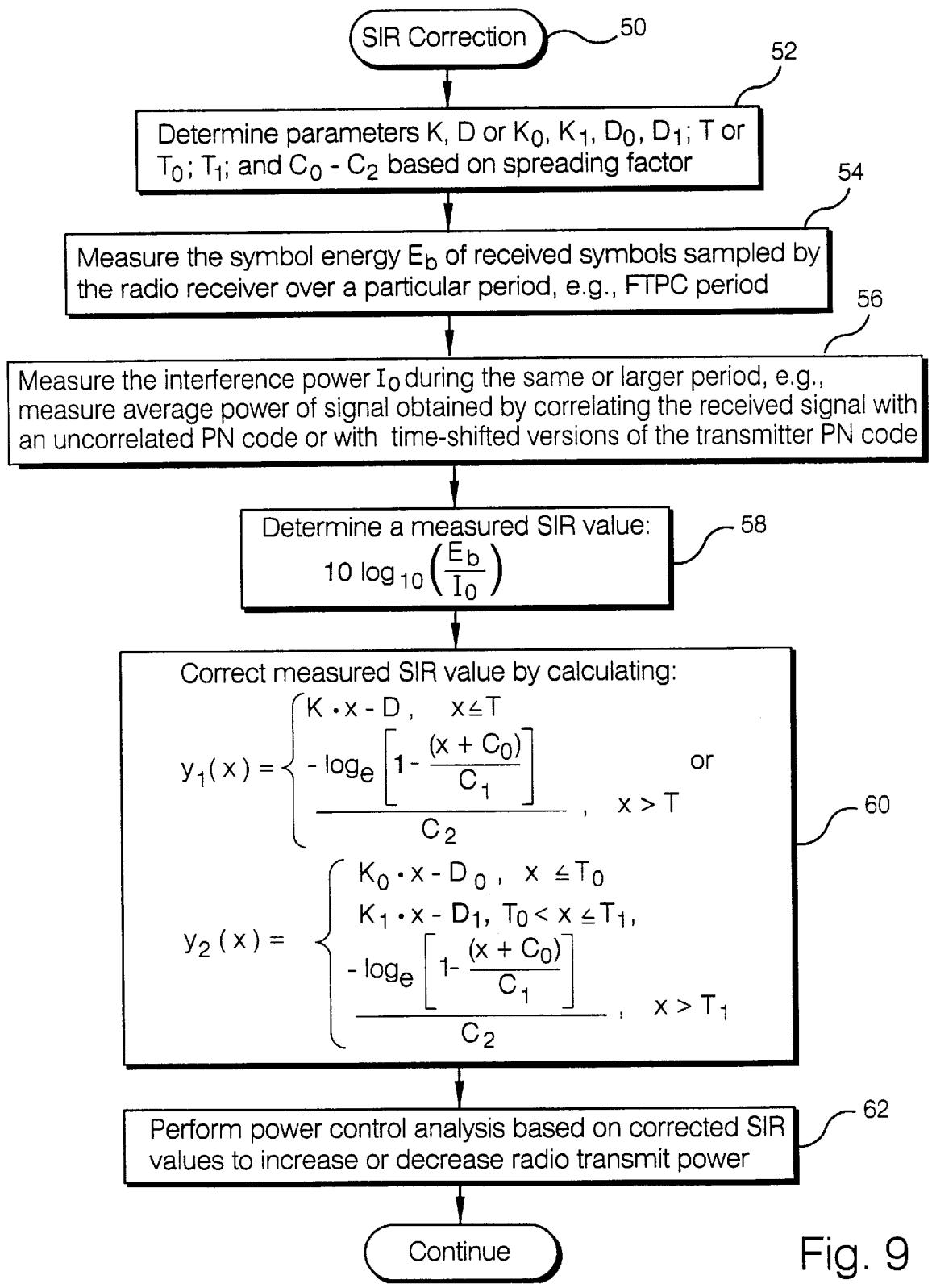
FIG. 9 is a flowchart diagram illustrating procedures for implementing a measured SIR correction technique in accordance with one example implementation of the present invention.

FIG. 9 is a flowchart diagram illustrating procedures for implementing a measured SIR correction technique that can be employed in one example implementation of the present invention. The first step of the SIR correction routine (block 50) is to determine the correction function parameters based on the spreading factor used in the particular CDMA receiver (block 52). Based on that spreading factor, specific values for K, D, T, and $C_0$–$C_2$ (for the first example embodiment) or $K_0$, $K_1$, $D_0$, $D_1$, $T_0$, $T_1$, and $C_0$–$C_2$ (for the second example embodiment) are determined and stored in memory. While the remainder of the procedures described below in conjunction with blocks 54–62 are repeatedly carried out, the determination of the parameters in block 52 need only be performed once assuming that the spreading factor remains the same.

The data bit energy $E_b$ of the received symbols sampled by the radio receiver is measured over a particular period, e.g., the TPC period (block 54). The interference power $I_o$ is also measured during that same period (block 56). That interference power can be measured by simply averaging the power of signals obtained by de-spreading the received signals with an uncorrelated PN code. A measured SIR value is determined by dividing $E_b$ by $I_o$ (block 58), and the result is expressed in decibel (dB) units according to the following:

$$SIR = 10 * \log_{10}\left(\frac{E_b}{I_0}\right)[dB]. \quad (6)$$

The measured SIR value is then corrected by calculating $y_1(x)$ or $y_2(x)$ in accordance with the formulas set forth in equations (3) and (4), respectively, depending upon whether the first or the second example embodiment is employed (block 60). Power control analysis is then performed based on those corrected SIR values to increase or decrease radio transmit power (block 62). For example, if the radio receiver is in a base station, the radio receiver performs the power control analysis and appropriately increases or decreases a mobile station's transmit power.

The present invention allows accurate SIR measurements for the large range of input values using a simple and flexible analytical (closed form) solution for SIR correction. That solution is readily adaptable to different receiver algorithms for signal energy and interference estimation, and may be efficiently implemented using a suitably programmed digital signal processor or using a table look-up method.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims. For example, while one advantageous application of the present invention is to base station power control of mobile transmit power, the present invention may be used in other environments where accurate SIR measurements are desired, such as mobile-assisted handover and power control implementations that involve the mobile as well as the base station.

What is claimed is:

1. In a communications system, a method comprising the steps of:
   receiving a signal transmitted over a communications channel;
   measuring an estimate of an energy value and an interference value of the received signal;
   determining a measured signal-to-interference ratio (SIR) value using the measured energy value and the measured interference value;
   determining that the measured SIR value exceeds an SIR saturation threshold; and thereafter,
   correcting the measured SIR value for nonlinearity to obtain a corrected SIR value.

2. The method in claim 1, further comprising:
   providing a correction function that includes a linear part and a nonlinear part such that the measured SIR value is corrected for nonlinearity using the correction function.

3. The method in claim 2, wherein the nonlinear part of the correction function is an inverse of an approximate exponential function that approximates a non-linear portion of a curve corresponding to measured SIR values.

4. The method in claim 2, wherein the nonlinear part of the correction function is based on a logarithmic function and includes parameters selected to minimize error between the corrected SIR value and a corresponding actual SIR value.

5. The method in claim 2, wherein the linear part includes a first linear component and a second linear component.

6. The method in claim 2, wherein the correction function is defined by the following:

$$y_1(x) = \begin{cases} K \cdot x - D, & x \leq T \quad \text{(linear part)} \\ \dfrac{-\log_e\left[1 - \dfrac{(x + C_0)}{C_1}\right]}{C_2}, & x > T \quad \text{(non-linear part)} \end{cases}$$

where $y_1(x)$ is the corrected SIR value, x is the measured SIR value in dB units, T is an SIR threshold, and K, D, $C_0$–$C_2$ are coefficients.

7. The method in claim 6, wherein K, D, and $C_0$–$C_2$ are selected to minimize error between the corrected SIR value and a corresponding actual SIR value.

8. The method in claim 6, wherein the communications system is a spread spectrum radio communications system and the coefficients $C_0$–$C_2$ are determined based on a spreading factor used to spread information to be transmitted over an available frequency spectrum.

9. The method in claim 2, wherein the correction function is defined by the following:

$$y_2(x) = \begin{cases} K_0 \cdot x - D_0, & x \leq T_0 \quad \text{(linear 1)} \\ K_1 \cdot x - D_1, & T_0 < x \leq T_1 \quad \text{(linear 2)} \\ \dfrac{-\log_e\left[1 - \dfrac{(x + C_0)}{C_1}\right]}{C_2}, & x > T_1 \quad \text{(non-linear 3)} \end{cases}$$

where $y_2(x)$ is the corrected SIR value, x is the measured SIR value in dB units, $T_0$ and $T_1$ are SIR thresholds, $K_0$, $K_1$, $D_0$, $D_1$, and $C_0$, $C_1$, and $C_2$ are coefficients.

10. The method in claim 9, wherein the constants and coefficients are selected to minimize error between the corrected SIR value and a corresponding actual SIR value.

11. The method in claim 10, wherein the communications system is a spread spectrum radio communications system and the constants and coefficients are determined as a function a spreading factor used to spread information to be transmitted over an available frequency spectrum.

12. A method of processing in a receiver a signal comprised of a group of spread spectrum call signals sharing a common frequency band, comprising:

analyzing one of the call signals from among the group and determining an associated signal energy value and an interference value;

determining a measured signal to interference ratio (SIR) value using the measured signal energy and interference values;

setting a first SIR threshold;

if the measured SIR value is less than or equal to the first SIR threshold, correcting the measured SIR value in a first fashion; and if the measured SIR value is greater than the first SIR threshold, correcting the measured SIR value in a second fashion.

13. A method of processing in a receiver a signal comprised of a group of spread spectrum call signals sharing a common frequency band, comprising:

analyzing one of the call signals from among the group and determining an associated signal energy value and an interference value;

determining a measured signal to interference ratio (SIR) value using the measured signal energy and interference values;

setting a first SIR threshold;

if the measured SIR value is less than or equal to the first SIR threshold, processing the measured SIR value in a first fashion;

if the measured SIR value is greater than the first SIR threshold, processing the measured SIR value in a second fashion; and providing a correction function defining a first relationship between actual SIR values and measured SIR values less than or equal to the first SIR threshold and a second relationship between actual SIR values and measured SIR values greater than the first SIR threshold.

14. The method in claim 13, wherein the first relationship is linear and the second relationship is nonlinear.

15. The method in claim 14, wherein the nonlinear relationship is logarithmic.

16. A method of processing in a receiver a signal comprised of a group of spread spectrum call signals sharing a common frequency band, comprising:

analyzing one of the call signals from among the group and determining an associated signal energy value and an interference value;

determining a measured signal to interference ratio (SIR) value using the measured signal energy and interference values;

setting a first SIR threshold;

if the measured SIR value is less than or equal to the first SIR threshold, processing the measured SIR value in a first fashion; and if the measured SIR value is greater than the first SIR threshold, processing the measured SIR value in a second fashion, wherein processing the SIR value in the first fashion includes:

if the measured SIR value is less than or equal to a second SIR threshold, processing the measured SIR value in the first fashion using a first equation; and if the measured SIR value is greater than the first SIR threshold, processing the measure SIR value in the first fashion using a second equation.

17. The method in claim 16, wherein the first equation is as follows:

$$y_1(x) = \begin{cases} K \cdot x - D, & x \leq T \quad \text{(linear part)} \\ \dfrac{-\log_e\left[1 - \dfrac{(x + C_0)}{C_1}\right]}{C_2}, & x > T \quad \text{(non-linear part)} \end{cases}$$

where $y_1(x)$ is a corrected SIR value, x is the measured SIR value in dB units, T is an SIR threshold, and K, D, $C_0$–$C_2$ are coefficients.

18. The method in claim 17, wherein the second equation is as follows:

$$y_2(x) = \begin{cases} K_0 \cdot x - D_0, & x \leq T_0 \quad \text{(linear 1)} \\ K_1 \cdot x - D_1, & T_0 < x \leq T_1 \quad \text{(linear 2)} \\ \dfrac{-\log_e\left[1 - \dfrac{(x + C_0)}{C_1}\right]}{C_2}, & x > T_1 \quad \text{(non-linear 3)} \end{cases}$$

where $y_2(x)$ is a corrected SIR value, x is the measured SIR value in dB units, $T_0$ and $T_1$ are SIR thresholds, $K_0$, $K_1$, $D_0$, $D_1$, and $C_0$, $C_1$, and $C_2$ are coefficients.

19. The method in claim 18, wherein the thresholds and coefficients are determined as a function of a spreading factor used to spread information to be transmitted over an available frequency spectrum.

20. The method in claim 12, further comprising:

controlling a power level of the one call signal using the corrected SIR value.

21. A spread spectrum communications system, comprising:
   plural mobile stations, and
   at least one base station, where the mobile stations and the base station communicating using a common frequency band and code division multiple access (CDMA) procedures, the base station including a controller estimating a signal to interference ratio (SIR) associated with a communication between one of the mobile stations and the base station, detecting that the SIR estimate exceeds an SIR saturation threshold, and in response to the detecting step compensating the SIR estimate to minimize a difference between the SIR estimate and an actual SIR corresponding to the SIR estimate.

22. The spread spectrum communications system in claim 21, wherein the controller generates a power control command based on the compensated SIR estimate and transmits that power control command to the one mobile station.

23. The spread spectrum communications system in claim 21, wherein the controller compensates for nonlinearity in SIR estimates for SIR values above a threshold.

24. The spread spectrum communications system in claim 21, wherein the controller compensates the SIR estimate in accordance with the following:

$$y_1(x) = \begin{cases} K \cdot x - D, & x \leq T \quad \text{(linear part)} \\ \dfrac{-\log_e\left[1 - \dfrac{(x + C_0)}{C_1}\right]}{C_2}, & x > T \quad \text{(non-linear part)} \end{cases}$$

where $y_1(x)$ is the corrected SIR value, x is the measured SIR value in dB units, T is a SIR threshold, and K, D, and $C_0$–$C_2$ are coefficients.

25. The spread spectrum communications system in claim 24, wherein the coefficients are determined as a function a spreading factor used to spread information to be transmitted over the common frequency band.

26. The spread spectrum communications system in claim 21, wherein the controller compensates the SIR estimate in accordance with the following:

$$y_2(x) = \begin{cases} K_0 \cdot x - D_0, & x \leq T_0 \quad \text{(linear 1)} \\ K_1 \cdot x - D_1, & T_0 < x \leq T_1 \quad \text{(linear 2)} \\ \dfrac{-\log_e\left[1 - \dfrac{(x + C_0)}{C_1}\right]}{C_2}, & x > T_1 \quad \text{(non-linear 3)} \end{cases}$$

where $y_2(x)$ is the corrected SIR value, x is the measured SIR value in dB units, $T_0$ and $T_1$ are SIR thresholds, $K_0$, $K_1$, $D_0$, $D_1$, and $C_0$–$C_2$ are coefficients.

27. The spread spectrum communications system in claim 26, wherein the coefficients are determined as a function a spreading factor used to spread information to be transmitted over the common frequency band.

* * * * *